United States Patent
Lucas

[11] 3,797,772
[45] Mar. 19, 1974

[54] EXPANDIBLE CHUCK
[75] Inventor: Robert G. Lucas, Janesville, Wis.
[73] Assignee: Beloit Corporation, Beloit, Wis.
[22] Filed: Mar. 1, 1972
[21] Appl. No.: 230,681

[52] U.S. Cl. .............................. 242/72.1, 242/68.2
[51] Int. Cl. ............................................ B65h 75/24
[58] Field of Search.................. 242/68.2, 72.1, 72

[56] References Cited
UNITED STATES PATENTS

| | | | |
|---|---|---|---|
| 2,598,398 | 5/1952 | Littell | 242/72.1 |
| 2,578,953 | 12/1951 | Tyrrell | 242/72.1 X |
| 2,587,885 | 3/1952 | Paxson | 242/72.1 |
| 2,670,905 | 3/1954 | Grauer | 242/72.1 |

*Primary Examiner*—George F. Mautz
*Assistant Examiner*—Edward J. McCarthy
*Attorney, Agent, or Firm*—Hill, Sherman, Meroni, Gross & Simpson
7780

[57] ABSTRACT

Expansible chuck supporting a roll of web material for winding or unwinding. The chuck is supported to be cantilevered from a winding station and has a spindle projecting from the support for the chuck and a chuck bearing housing freely rotatable on the spindle. The chuck bearing housing has external frusto-conical surfaces engaged by spaced internal frusto-conical segments on the insides of chuck leaves, guided in the chuck bearing housing for movement therealong. An externally threaded member has threaded engagement with internal threads in the chuck bearing housing and has connection with the chuck leaves to translationally move the chuck leaves upon turning of the threaded member. A hand wheel and torque shaft are depressible along the spindle to interengage and turn the threaded member. A locking member carried by the threaded member is held from rotation relative to the chuck leaves by the chuck bearing housing, and is biased to interengage the threaded member and hold it from rotation relative to the chuck bearing housing, to hold the chuck leaves in position.

17 Claims, 3 Drawing Figures

EXPANDIBLE CHUCK

FIELD OF THE INVENTION

Expansible chuck for engaging and supporting the core of a roll of web material, such as paper, foil, textiles, or plastic film and holding the core to accommodate winding or unwinding of the roll.

BACKGROUND, SUMMARY AND ADVANTAGES OF INVENTION

Winding stations for paper and the like frequently support a roll of paper on expansible chucks cantilevered from the core for the roll and supported on level rails as in U.S. Pat. No. 3,383,064, dated May 14, 1968. The nip loading required to hold the winding roll against its winder drain has heretofore been transmitted to the chucks by loading arms that pushed against the chucks. This created bending moments from the roll weight reaction and the loading nip force and caused the core for the roll, which may be plastic, paper or metal, such as steel, to bend. This bending of the core causes non-uniform nips. With enlarged roll diameters bending or flexing of the core by the external forces in many cases has destroyed the roll and paper.

In accordance with the principles of the present invention, the core chucks are supported at the winding station in cantilevered relation with respect thereto, to materially reduce the bending forces on the winding core by applying all of the nip and weight forces inside of the core.

The chuck comprises expansible rotating chuck leaves radially expansible in concentric relation with respect to the center of the chuck by pressing inwardly on a hand wheel and manually turning the wheel to expand or contract the chuck leaves to concentrically chuck the core internal diameter. The chuck leaves are automatically locked in their expanded positions upon release of the hand wheel.

The advantages of the present invention are that the concentric cbucks can support heavy rolls of paper and concentrically chuck cores of commerical tolerance.

A further advantage of the invention is that the chuck may be brought into clamping engagement with the core in a simplified manner and may support the core and drum for higher speed winding than previous chucking mechanisms for winders.

A still further advantage of the invention is that all of the operative parts radially expending and contracting the chuck leaves are carried within the confines of a small core.

A still further advantage of the invention is in the construction of the chuck to have a wide range of diametral expansion and to concentrically chuck the core shaft and roll, without the use of tools or external power sources.

A still further advantage of the invention is the simplicity of the chuck and actuating mechanism therefor together with the self-locking arrangement for the chuck leaves, effective as soon as the chuck leaves have been brought into engagement with the inside of the core and the hand is removed from the actuating mechanism.

A principal object of the invention, therefore, is to provide a simplified form of chuck, supporting a core and roll in cantilevered relation with respect to the support for the chuck and arranged with a view toward utmost simplicity and efficiency in construction and operation.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF INVENTION

Figure 1:
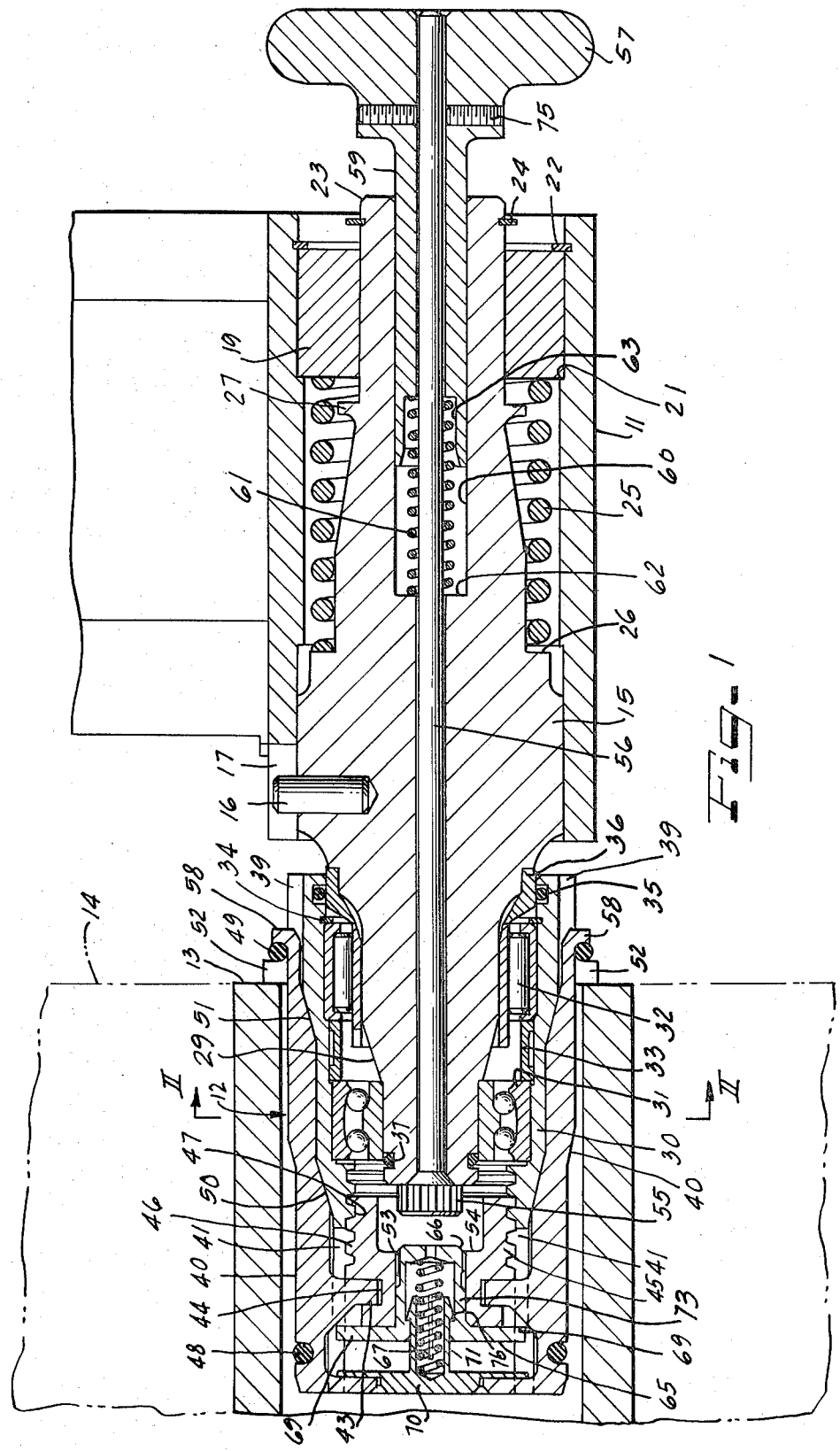
FIG. 1 is a longitudinal sectional view taken through a chuck constructed in accordance with the principles of the present invention showing the chuck supported on a support at a winding station and extending within the core of the roll of paper in position to be expanded to support the core in cantilevered relation with respect to the winding station.

In the embodiment of the invention illustrated in the drawings, I have shown in FIG. 1 a fragment of a carriage assembly for a winder for rolls of web-like material, such as paper, cloth, foil, plastic and the like. The carriage assembly includes a chuck support 11 supported thereon free from bending with respect thereto and supporting a chuck 12 in cantilevered relation with respect thereto for chucking within a core 13 for a roll of paper and like web material 14.

It should here be understood that coaxial chucks are provided for opposite ends of the core and that one chuck, which may be the left-hand chuck is rigid relative to its support while the opposite chuck is floatingly carried in its support to accommodate variations in lengths of cores.

The chuck support 11 has a generally cylindrical interior portion carrying a spindle 15 mounted for axial movement therealong. As shown in FIG. 1, a pin 16 is carried in the spindle 15 and extends radially therefrom and has slidable engagement with a slot 17 extending axially along the chuck support, to hold the spindle from rotation with respect to said chuck support. A cylindrical block 19 is carried within the outer end portion of the chuck support 11 and abuts a shouldered portion 21 thereof at its inner end, and is held in engagement therewith as by a snap ring 22. The block 19 forms a slidable support for a reduced diameter outer end portion 23 of the spindle 15. A snap ring 24 is provided to retain said spindle to said chuck support and limit axial forward movement of said spindle therealong.

A compression spring 25 encircles the spindle 15 for a portion of the length thereof and is seated at one end on the inner face of the block 19 and at its opposite end on a shouldered portion 26 of said spindle 15. An external shoulder 27 on the spindle 15 limits retractable movement of the spindle against the spring 25.

The spindle 15 has a reduced diameter end portion 29 extending within the core 13 and is shown as forming a bearing support for a rotatable chuck bearing housing 30. The chuck leaf support member shown as being a bearing housing 30 is rotatably supported adjacent the inner end portion 29 of the spindle 15 on an anti-friction bearing 31 of the radial thrust type, taking the radial and axial thrusting loads on said chuck bearing housing. Spaced outwardly of the anti-friction bearing 31 is an anti-friction bearing 32 of the roller type carried on the spindle 15, for rotatably supporting the outer end portion of the chuck bearing housing 30. A spacer 33 spaces the bearings 31 and 32 apart. The bearing 31, spacer 33, and bearing 32 are retained to the chuck bearing housing 30 by a retainer ring 34. An O-ring 35 is recessed in the chuck bearing housing and is in sealing engagement with a ring member 36 located adjacent to the inner race of the bearing 32, and forming a seal for said bearing. A detent ring 37 is partially recessed in the inner end of the spindle 15 and engages the inner race of the bearing 31 to hold said bearing on said spindle.

The chuck bearing housing 30 has a series of circumferentially spaced slots 39 spaced thereabout and extending along the rearward portion thereof and forming guides for chuck leaves 40, guiding said chuck leaves for axial movement of said chuck leaves along said chuck bearing housing and accommodating said chuck leaves to rotationally move with said chuck bearing housing. A series of circumferentially spaced slots 41 in axial alignment with the slots 39 extend along the forward portion of the chuck bearing housing 30 for guiding the chuck leaves 40 for axial movement along said chuck bearing housing to expand and contract said chuck.

Figure 2:
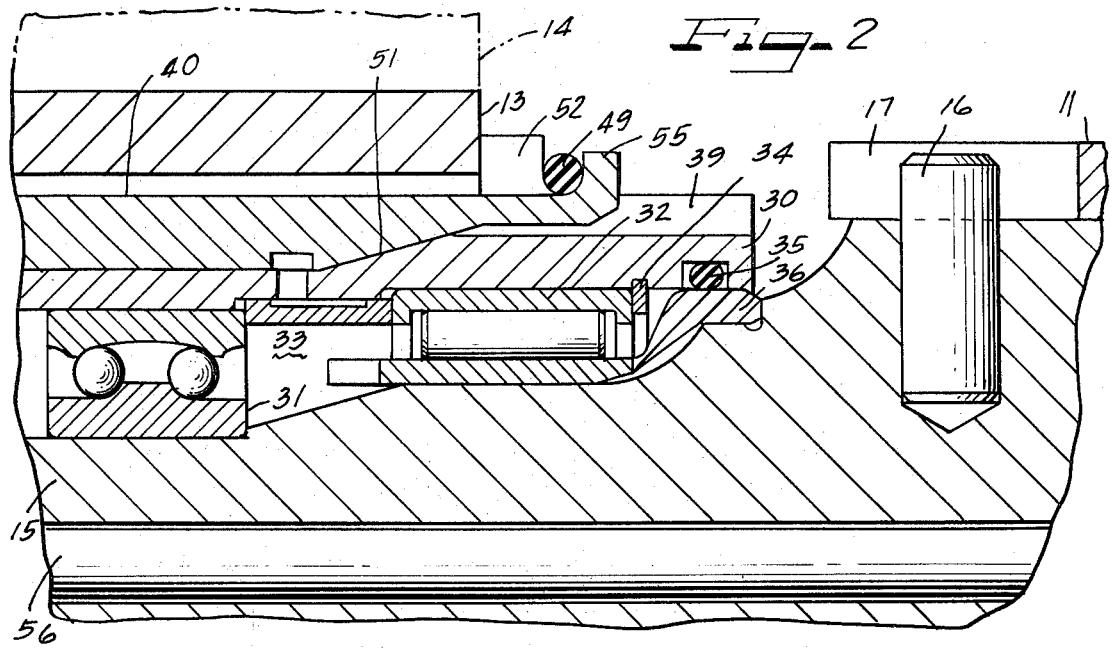
FIG. 2 is an enlarged fragmentary longitudinal sectional view, more clearly illustrating certain details of the invention.
Figure 3:
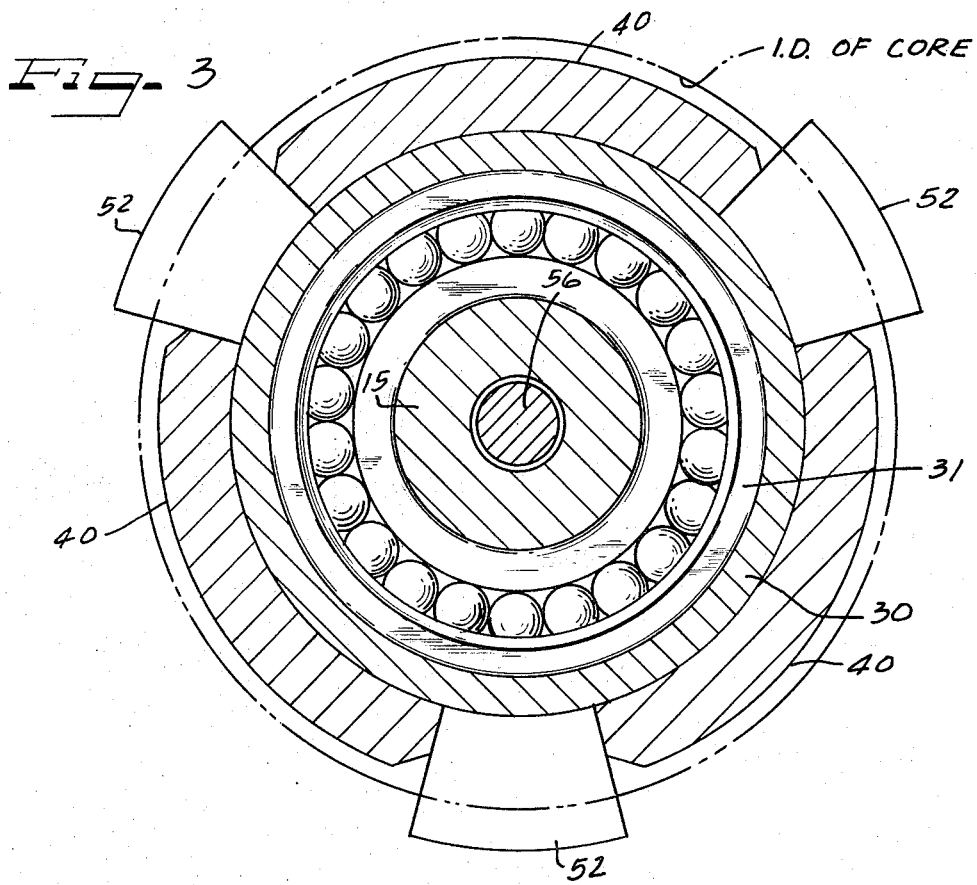
FIG. 3 is a transverse sectional view taken substantially along line III—III of FIG. 1, with certain parts removed.

As shown in FIG. 1, tangs 43 extend radially inwardly of the chuck leaves 40 along the slots 41 and inwardly therefrom into an annular groove 44 in a sleeve-like externally threaded member 45 having external threads 46, shown as being square threads having threaded engagement with internal threads 47 formed in the chuck bearing housing 30. Spring means, which may be garter springs, but which are herein shown as being O-rings 48 and 49 are partially recessed within the chuck leaves to retain said chuck leaves to the chuck bearing housing 30 and accommodate expansible movement of said chuck leaves relative to said chuck bearing housing. As shown in FIGS. 1 and 2, the O-ring 49 is interposed between stop wings 52 extending radially of the chuck bearing housing between the slots 39, and radial shoulders 58 extending radially of the rear end portions of said chuck leaves 40. The stop wings 52 abut the end of the core 13 and locate the chuck relative to the core, to assure accurate location of the core with respect to other apparatus, such as the web slitters (not shown).

The chuck bearing housing 30 has two axially spaced frusto-conical camming surfaces 50 and 51 having camming engagement with two corresponding internal frusto-conical follower faces on the insides of the chuck leaves 40, to cam said chuck leaves to expand upon axial movement of said chuck leaves toward the chuck support 11, and to contract said chuck leaves upon movement of said leaves inwardly along the core 13 by operation of the threaded member 45, as will now be described.

The threaded member 45 is shown in FIG. 1 as having internal splines 53 at the inner end of a reduced internal diameter portion 54 thereof, adapted to be engaged by the splines of a splined head 55, on the inner end of the torque shaft 56. The torque shaft 56 extends for the length of the spindle 15 and forms a mounting for a hand wheel 57 at the outer end thereof, which may be pinned or otherwise secured thereto.

The hand wheel 57 is shown in FIG. 1 as being integrally formed on the outer end of a reduced diameter sleeve portion 59. Said hand wheel is secured to the torque shaft 56 as by set screws 75, or any other suitable securing means. Said sleeve portion 59 is slidably and rotatably mounted in an enlarged passageway 60 extending along the spindle 15 for a portion of the length thereof. The passageway 60 is in axial alignment with and communicates with a coaxial reduced diameter passageway, slidably carrying the torque shaft 56. A compression spring 61 is seated in the enlarged passageway 60 on an inner shouldered portion 62 thereof, at the juncture between the enlarged and reduced diameter passageways extending along said spindle. The opposite end of said spring is seated in a recessed portion 63 in the sleeve portion 59 of the hand wheel 57, to bias the hand wheel 57 and torque shaft 56 in the position shown in FIG. 1.

A locking member 65, shown as having a splined reduced diameter splined end portion 66 is engaged with the splines of the threaded member 45, by the bias of a spring 67. The locking member 65 has a series of radial tangs 69, corresponding in number to the slots 41 in the chuck bearing housing 30 and having slidable engagement with said slots, to hold said locking member 64 from rotation relative to the chuck leaves 40.

An abutment member 70 closes the ends of the chuck leaves 40 and is held in abutting engagement therewith by the compression spring 67. Said spring 67 is seated within an inwardly projecting hollow guide portion 71 of said abutment member at one end, and within the end of a hollow portion 73 of the locking member 65 at its opposite end. The hollow guide portion of the abutment member 70 is in the form of a split tube having a barbed inner end, which is forced past a detent retaining shoulder 76 of the locking member 65 which retains said tube to said locking member, but accommodates slidable movement of said abutment member and tube relative to said locking member. The compression spring 67 serves to bias the externally splined end 66 of said locking member 65 into engagement with the internal splines 53 of the threaded member 45, as pressure on said locking member is released by withdrawal of the splined head 55 of the torque shaft 56 from said locking member.

It will be here understood that as the splined head 55 is withdrawn from the splines 53, the splined end of the locking member 65 comes into engagement with said splines 53 and is held in engagement therewith by the compression spring 67. Since the locking member 65 is held from rotation with respect to the chuck bearing housing 30 and chuck leaves 40, and since the splined head is being withdrawn from the splines 53 as the splined end of the locking member is biased into engagement with said splines, the splines of said locking member are always in position to readily come into engagement with the internal splines 53 and lock the threaded member 45 from rotation.

Depression of the hand wheel 57 to engage the splines 55 with the splines 53 and turning movement thereof in a clockwise direction will thus effect movement of the threaded member 45 and chuck leaves 40 outwardly toward the support 11, and effect expansion of the chuck leaves by engagement of the frusto-conical camming surfaces 50 and 51 thereof with the spaced internal follower camming surfaces on the chuck leaves 40. When the chuck leaves have been expanded the proper amount to grip the core 13, and the hand is removed from the hand wheel 57, the compression spring 61 will disengage the splined head of the torque shaft from the splines 53. At this time, the splines inner end of the locking member 65 will come into engagement with the splines 53 and hold the threaded member from rotation.

When it is desired to collapse the chuck leaves, the hand wheel 57 is again pushed inwardly to disengage the splined locking member 65 from the internal splines 53 and engage the splines of the splined head 55 with said internal splines. The hand wheel 57 is then turned in a clockwise direction to contract the chuck leaves 40 and accommodate the core and roll to be removed from the chuck. Upon release of the hand wheel 57, the splined end of the locking member 65 will again lock the threaded member 45 from turning movement.

I claim as my invention:

1. An expansible chuck cantilevered from a winder frame of the surface winder type and in combination with a winder frame, a spindle, chuck support means carried by the winder frame and carrying the spindle to project therefrom in cantilevered relation with respect thereto, a chuck leaf support member carried by said spindle for free rotation with respect to said spindle, a plurality of chuck leaves spaced about said chuck leaf support member and guided for axial movement relative to said chuck leaf support member, spaced camming means on said chuck leaf support member and said chuck leaves, said camming means on said chuck leaf support member engaging said camming means on said chuck leaves and effecting concentric radial expansion of said chuck leaves by axial movement of said chuck leaves along said chuck leaf support member, a chuck leaf adjustment member, a depressible drive connection to said adjustment member, an operative connection between said adjustment member and said chuck leaves operable by depression of said drive connection and turning movement thereof to effect radial expansible movement of said chuck leaves, and releasable from said adjustment member to effect locking of said chuck leaves in their expanded positions.

2. The expansible chuck of claim 1, wherein a hand wheel operates the depressible drive connection, and wherein the operative connection between the depressible drive connection and chuck leaves comprises a motion translating connection, translating rotational motion of said hand wheel to translational motion, and effective to move said chuck leaves relative to said chuck leaf support member to effect concentric expansion thereof.

3. The expansible chuck of claim 2, wherein the depressible drive connection comprises a torque shaft extending through said spindle, and wherein the connection from said torque shaft to said motion translating connection is a releasable drive connection.

4. The expansible chuck of claim 3, wherein the hand wheel and torque shaft are axially movable with respect to said spindle along the center thereof to effect a drive connection between said torque shaft and said motion translating drive connection to effect radial expansible and contractible movement of said chuck leaves, and wherein spring means bias said hand wheel and torque shaft to release said releasable drive connection upon release of of hand wheel.

5. The expansible chuck of claim 4, wherein the motion translating connection comprises a threaded connection including a threaded member coaxial with the axis of said torque shaft and axially movable relative to said torque shaft upon rotation thereof and a drive connection from said threaded member to said chuck leaves to effect axial movement of said chuck leaves relative said camming means upon rotatable movement of said threaded member.

6. The expansible chuck of claim 4, wherein the motion translating drive connection comprises an externally threaded member coaxial with the axis of said torque shaft, and a drive connection between said externally threaded member and said chuck leaves rectilinearly moving said chuck leaves relative to camming means upon rotational and translational movement of said externally threaded member.

7. The expansible chuck of claim 6, wherein the releasable drive connection between said torque shaft and said externally threaded member comprises a releasable splined connection, and wherein locking means are provided between said chuck leaves and externally threaded member and comprise a locking member carried by said externally threaded member for slidable movement with respect thereto along the axis thereof, and having slidable engagement with said chuck leaves and held from rotation relative to said chuck leaves, said locking member having a splined end having interengaging connection with said externally threaded member and moved out of interengagement therewith by axial movement of said torque shaft to radially adjust said chuck leaves, and spring means biasing said locking member to interengage the splined end thereof with said externally threaded member.

8. The expansible chuck of claim 6, wherein slots extend along said chuck leaf support member and having guiding engagement with said chuck leaves, and wherein the axial drive connection between said externally threaded member and said chuck leaves comprises a tang extending radially inwardly of each of said chuck leaves and a slidable engaging connection between said tangs and said externally threaded member.

9. The expansible chuck of claim 8, wherein locking means are provided for holding said externally threaded member from rotation relative to said chuck leaf support member, and thereby locking said chuck leaves in predetermined required positions of expansion to grip within the core of a roll.

10. The expansible chuck of claim 9, wherein the cooperating camming means comprise two laterally spaced external frusto-conical surfaces spaced along said chuck bearing housing, each surface being inclined at the same angle as the other, and two internal frusto-conical segments extending along the inside of each chuck leaf and having following engagement with said external frusto-conical surfaces on each chuck leaf support member.

11. In an expansible chuck for supporting rolls of paper and the like for winding and unwinding, a cantilever chuck support, a spindle cantileverly carried by said chuck support and projecting therefrom, a chuck bearing housing coaxial with said spindle and extending along said spindle and projecting therefrom, bearing means on said spindle journalling said chuck bearing housing on said spindle for free rotation with respect thereto and holding said chuck bearing housing from axial movement relative to said spindle, a plurality of chuck leaves circumferentially spaced about said chuck bearing housing in equally spaced relation with respect to each other, means guiding said chuck leaves for axial movement along said chuck bearing housing and holding said chuck leaves for rotation with said chuck bearing housing, means yieldably retaining said chuck leaves to said chuck bearing housing, and means expansibly moving said chuck leaves radially of said chuck bearing housing equal amounts, including external camming surfaces on said chuck bearing housing and internal cooperating follower camming surfaces on said chuck leaves, and means rectilinearly moving said chuck leaves along said external camming surfaces on said chuck bearing housing, and holding said chuck leaves in fixed relation with respect thereto in radially expanded or contract relation relative to said chuck bearing housing.

12. The expansible type chuck of claim 11, wherein the means moving said chuck leaves along said external camming surfaces of said chuck bearing housing comprises an externally threaded member, coaxial with the axis of rotation of said chuck bearing housing and having threaded engagement with said chuck bearing housing, a slidable connection between said externally threaded member and said chuck leaves rectilinearly moving said chuck leaves upon translational and rotational motion of said chuck bearing housing.

13. The expansible chuck of claim 12, including a hand wheel rotatably carried in said spindle coaxial with the axis thereof and disposed outside of the chuck support therefor, a torque shaft extending from said hand wheel along the axis of said chuck spindle beyond the end thereof, and movable into interengagement with said externally threaded member by axial movement of said hand wheel and effective to turn said external threaded member by turning movement of said hand wheel.

14. The expansible chuck of claim 13, including locking means coaxial with said externally threaded member and held from rotation by said chuck spindle and biased into interengagement with said externally threaded member upon release of the interengaging drive connection between said torque shaft and said externally threaded member.

15. The expansible chuck of claim 14, including spring means disengaging said releasable drive connection between said torque shaft and said externally threaded member, and other spring means biasing said locking member into interengagement with said externally threaded member upon release of said interengaging drive connection.

16. The expansible chuck of claim 15, wherein said torque shaft has an enlarged diameter splined end, wherein said externally threaded member has an internally splined portion adapted to be engaged by the splined end of said torque shaft, and wherein said locking member has an externally splined portion adapted to have interengagement with said internally splined portion of said threaded member to hold said threaded member from rotation upon release of said torque shaft from said externally threaded member.

17. The expansible chuck of claim 15, including radial stops extending radially of said chuck bearing housing between said chuck leaves, for engaging the end of the core of the roll of paper and locating said chuck leaves relative to the core of the roll of paper.

* * * * *